US008338521B2

(12) United States Patent
Wu

(10) Patent No.: US 8,338,521 B2
(45) Date of Patent: Dec. 25, 2012

(54) INTERMEDIATE TRANSFER MEMBER AND COMPOSITION

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/049,989

(22) Filed: Mar. 17, 2011

(65) Prior Publication Data

US 2012/0237863 A1 Sep. 20, 2012

(51) Int. Cl.
*C08K 3/04* (2006.01)

(52) U.S. Cl. ........................................................ 524/424

(58) Field of Classification Search ................... 524/424
See application file for complete search history.

(56) References Cited

U.S. PATENT DOCUMENTS 6,042,910 A * 3/2000 Kinouchi et al. ............ 428/35.7

* cited by examiner

*Primary Examiner* — Kriellion Sanders
(74) *Attorney, Agent, or Firm* — Hoffman Warnick LLC.

(57) ABSTRACT

There is described an intermediate transfer member comprising a seamless layer comprising a polyphenylsulfone and a cyclic alkylene terephthalate having dispersed therein carbon black particles. The composition used to manufacture the seamless intermediate transfer member is also described.

20 Claims, 2 Drawing Sheets

INTERMEDIATE TRANSFER MEMBER AND COMPOSITION

BACKGROUND

1. Field of Use

This disclosure is generally directed to a novel layer useful in electrophotographic imaging apparatuses, including digital, image on image, and the like.

2. Background

In electrophotographic printing, materials used in intermediate transfer members typically are composed of conductive powders dispersed in polyimide resins. The intermediate transfer member is typically a belt and the belt can be seamed or seamless. The polyimide resin includes thermoplastic polyimide resins and thermosetting polyimide resins such as polyimides and precursors of polyimides, and polyamideimides. The conductive powder includes carbon blacks, acetylene black, stannic oxide, indium oxide, potassium titanate and other types of conductive and semi-conductive powders that can be employed.

However, certain issues arise when using polyimides for intermediate transfer members. These include environmental emissions during manufacture and high cost due to complex manufacturing processes. Further, the performance of intermediate transfer members with respect to stain, abrasion and solvent resistance needs to be improved. The properties of superior toughness and high gloss are also required by intermediate transfer members. Materials satisfying the above requirements would be desirable.

Extrusion coating processes are typically used to manufacture thermoplastic intermediate transfer belts. Due to the availability of the die size, the size of intermediate transfer belts made from extrusion processes is limited.

It would be desirable to use processes other than extrusion processes to manufacture intermediate transfer belts. It would also be desirable to lower the cost of manufacture of intermediate transfer belts while improving their properties.

SUMMARY

According to an embodiment, there is provided an intermediate transfer member. The intermediate transfer member comprises a seamless layer of a polymer blend of polyphenylsulfone and cyclic alkylene terephthalate having dispersed therein carbon black particles.

According to an embodiment, there is provided a seamless intermediate transfer member comprising a seamless layer comprising carbon black particles, a polymer blend of polyphenylsulfone and cyclic alkylene terepthalate wherein the polyphenylsulfone is represented by

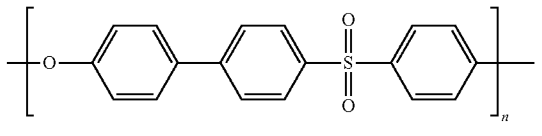

wherein n is from about 30 to about 5000, and cyclic alkylene terephthalate is represented by

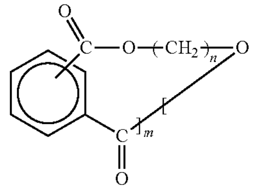

wherein m is from about 1 to about 100 and n is from about 1 to about 8, in a weight ratio of carbon black particles/polyphenylsulfone/cyclic alkylene terephthalate of from about 3/96/1 to about 30/36/34.

According to another embodiment there is described a coating composition comprising polyphenylsulfone, cyclic alkylene terephthalate, carbon black particles and a solvent selected from the group consisting of N-methylpyrrolidone, N,N'-dimethylformamide, tetrahydrofuran, and N,N'-dimethylacetamide, tetramethylene sulfone and monochlorobenzene.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

In the following description, reference is made to the chemical formulas that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Figure 1:
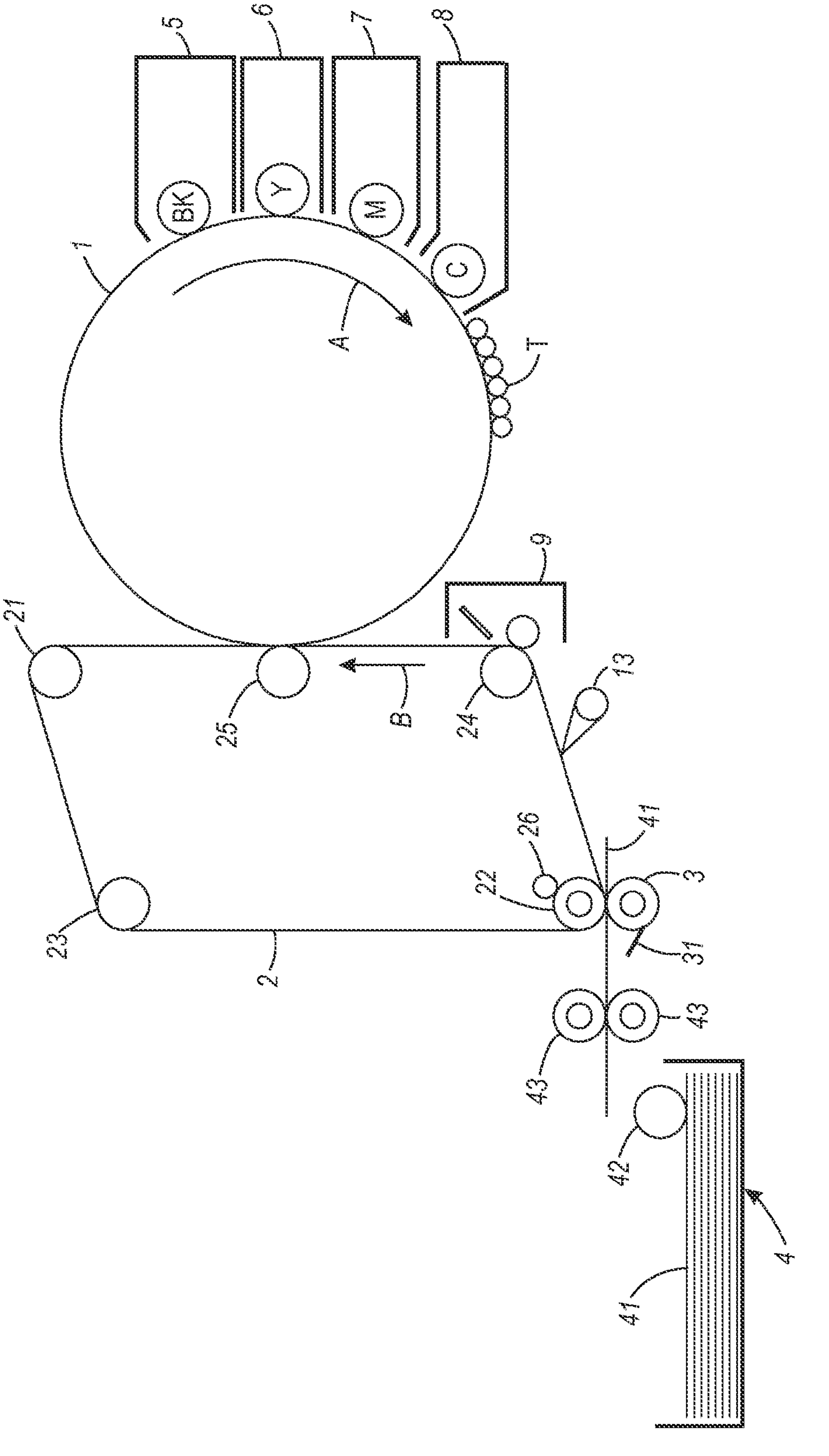
FIG. 1 is a schematic illustration of an image apparatus.

Referring to FIG. 1, an image-forming apparatus includes an intermediate transfer member as described in more detail below. The image-forming apparatus is an image-forming apparatus of an intermediate transfer system comprising a first transfer unit for transferring the toner image formed on the image carrier onto the intermediate transfer member by primary transfer, and a second transfer unit for transferring the toner image transferred on the intermediate transfer member onto the transfer material by secondary transfer. Also in the image-forming apparatus, the intermediate transfer member may be provided as a transfer-conveying member for conveying the transfer material in the transfer region for transferring the toner image onto the transfer material. Having the intermediate transfer member that transfers images of high quality and that remains stable for a long period is required.

The image-forming apparatus described herein is not particularly limited as far as it is an image-forming apparatus of intermediate transfer type, and examples include an ordinary monochromatic image-forming apparatus accommodating only a monochromatic color in the developing device, a color image-forming apparatus for repeating primary transfer of the toner image carried on the image carrier sequentially on the intermediate transfer member, and a tandem color image-forming apparatus having plural image carriers with developing units of each color disposed in series on the intermediate transfer member. More specifically, it may arbitrarily comprise an image carrier, a charging unit for uniformly charging the surface of the image carrier, an exposure unit for exposing the surface of the intermediate transfer member and forming an electrostatic latent image, a developing unit for developing the latent image formed on the surface of the image carrier by using a developing solution and forming a toner image, a fixing unit for fixing the toner unit on the transfer material, a cleaning unit for removing toner and foreign matter sticking to the image carrier, a destaticizing unit for removing the electrostatic latent image left over on the surface of the image carrier, and others by known methods as required.

As the image carrier, a known one may be used. As its photosensitive layer, an organic system, amorphous silicon, or other known material may be used. In the case of the image carrier of cylindrical type, it is obtained by a known method of molding aluminum or aluminum alloy by extrusion, and processing the surface. A belt form image carrier may also used.

The charging unit is not particularly limited, and known chargers may be used, such as a contact type charger using conductive or semiconductive roller, brush, film and rubber blade, scorotron charger or corotron charge making use of corona discharge, and others. Above all, the contact type charging unit has excellent charge compensation capability. The charging unit usually applies DC current to the electrophotographic photosensitive material, but AC current may be further superposed.

The exposure unit is not particularly limited, and, for example, an optical system device may be used, which exposes a desired image on the surface of the electrophotographic photosensitive material by using a light source such as semiconductor laser beam, LED beam, liquid crystal shutter beam or the like, or through a polygonal mirror from such light source.

The developing unit may be properly selected depending on the purpose, and, for example, a known developing unit for developing by using one-pack type developing solution or two-pack type developing solution, with or without contact, using brush and roller may be used.

The first transfer unit includes known transfer chargers such as a contact type transfer charger using member, roller, film and rubber blade, and scorotron transfer charger or corotron transfer charger making use of corona discharge. Above all, the contact type transfer charger provides excellent transfer charge compensation capability. Aside from the transfer charger, a peeling type charger may be also used together.

The second transfer unit may be the same as the first transfer unit such as a contact type transfer charger using transfer roller and others, scorotron transfer charger and corotron transfer charger. By pressing firmly by the transfer roller of the contact type transfer charger, the image transfer stage can be maintained. Further, by pressing the transfer roller or the contact type transfer charger at the position of the roller for guiding the intermediate transfer member, the action of moving the toner image from the intermediate transfer member to the transfer material may be done.

As the photo destaticizing unit, for example, a tungsten lamp or LED may be used, and the light quality used in the photo destaticizing process may include white light of tungsten lamp and red light of LED. As the irradiation light intensity in the photo destaticizing process, usually the output is set to be about several times to 30 times of the quantity of light showing the half exposure sensitivity of the electrophotographic photosensitive material.

The fixing unit is not particularly limited, and any known fixing unit may be used, such as heat roller fixing unit and oven fixing unit.

The cleaning unit is not particularly limited, and any known cleaning device may be used.

A color image-forming apparatus for repeating primary transfer is shown schematically in FIG. 1. The image-forming apparatus shown in FIG. 1 includes a photosensitive drum 1 as an image carrier, a transfer member 2 as an intermediate transfer member such as a transfer belt, a bias roller 3 as a transfer electrode, a tray 4 for feeding paper as a transfer material, a developing device 5 by BK (black) toner, a developing device 6 by Y (yellow) toner, a developing device 7 by M (magenta) toner, a developing device 8 by C (cyan) toner, a member cleaner 9, a peeling pawl 13, rollers 21, 23 and 24, a backup roller 22, a conductive roller 25, an electrode roller 26, a cleaning blade 31, a block of paper 41, a pickup roller 42, and a feed roller 43.

In the image-forming apparatus shown in FIG. 1, the photosensitive drum 1 rotates in the direction of arrow A, and the surface of the charging device (not shown) is uniformly charged. On the charged photosensitive drum 1, an electrostatic latent image of a first color (for example, BK) is formed by an image writing device such as a laser writing device. This electrostatic latent image is developed by toner by the developing device 5, and a visible toner image T is formed. The toner image T is brought to the primary transfer unit comprising the conductive roller 25 by rotation of the photosensitive drum 1, and an electric field of reverse polarity is applied to the toner image T from the conductive roller 25. The toner image T is electrostatically adsorbed on the transfer member 2, and the primary transfer is executed by rotation of the transfer member 2 in the direction of arrow B.

Similarly, a toner image of a second color, a toner image of a third color and a toner image of a fourth color are sequentially formed, and overlaid on the transfer member 2, and a multi-layer toner image is formed.

The multi-layer toner image transferred on the transfer member 2 is brought to the secondary transfer unit comprising the bias roller 3 by rotation of the transfer member 2. The secondary transfer unit comprises the bias roller 3 disposed at the surface side carrying the toner image of the transfer member 2, backup roller 22 disposed to face the bias roller 3 from the back side of the transfer member 2, and electrode roller 26 rotating in tight contact with the backup roller 22.

The paper 41 is taken out one by one from the paper block accommodated in the paper tray 4 by means of the pickup roller 42, and is fed into the space between the transfer member 2 and bias roller 3 of the secondary transfer unit by means of the feed roller 43 at a specified timing. The fed paper 41 is conveyed under pressure between the bias roller 3 and backup roller 22, and the toner image carried on the transfer member 2 is transferred thereon by rotation of the transfer member 2.

The paper 41 on which the toner image is transferred is peeled off from the transfer member 2 by operating the peeling pawl 13 at the retreat position until the end of primary transfer of the final toner image, and conveyed to the fixing device (not shown). The toner image is fixed by pressing and heating, and a permanent image is formed. After transfer of the multi-layer toner image onto the paper 41, the transfer member 2 is cleaned by the cleaner 9 disposed at the downstream side of the secondary transfer unit to remove the residual toner, and is ready for next transfer. The bias roller 3 is provided so that the cleaning blade 31 made of polyurethane or the like may be always in contact, and toner particles, paper dust and other foreign matter sticking by transfer are removed.

In the case of transfer of a monochromatic image, the toner image T after primary transfer is immediately sent to the secondary transfer process, and is conveyed to the fixing device, but in the case of transfer of multi-color image by combination of plural colors, the rotation of the transfer member 2 and photosensitive drum 1 is synchronized so that the toner images of plural colors may coincide exactly in the primary transfer unit, and deviation of toner images of colors is prevented. In the secondary transfer unit, by applying a voltage of the same polarity (transfer voltage) as the polarity of the toner to the electrode roller 26 tightly contacting with the backup roller 22 disposed oppositely through the bias roller 3 and transfer member 2, the toner image is transferred onto the paper 41 by electrostatic repulsion. Thus, the image is formed.

The intermediate transfer member 2 can be of any suitable configuration. Examples of suitable configurations include a sheet, a film, a web, a foil, a strip, a coil, a cylinder, a drum, an endless mobius strip, a circular disc, a belt including an endless belt, an endless seamed flexible belt, an endless seamless flexible belt, an endless belt having a puzzle cut seam, and the like. In FIG. 1, the transfer member 2 is depicted as a belt.

In an image on image transfer, the color toner images are first deposited on the photoreceptor and all the color toner images are then transferred simultaneously to the intermediate transfer member. In a tandem transfer, the toner image is transferred one color at a time from the photoreceptor to the same area of the intermediate transfer member. Both embodiments are included herein.

Transfer of the developed image from the photoconductive member to the intermediate transfer member and transfer of the image from the intermediate transfer member to the substrate can be by any suitable technique conventionally used in electrophotography, such as corona transfer, pressure transfer, bias transfer, and combinations of those transfer means, and the like.

The intermediate transfer member can be of any suitable configuration. Examples of suitable configurations include a sheet, a film, a web, a foil, a strip, a coil, a cylinder, a drum, an endless strip, a circular disc, a drelt (a cross between a drum and a belt), a belt including an endless belt, an endless seamed flexible belt, and an endless seamed flexible imaging belt.

Figure 2:
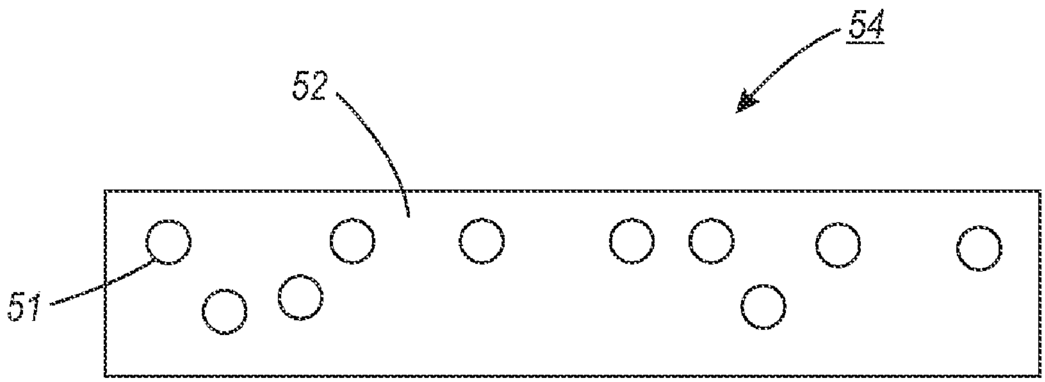
FIG. 2 is a schematic representation of an embodiment disclosed herein.

In an embodiment shown in FIG. 2, the intermediate transfer member 54 is in the form of a film in a one layer configuration. The intermediate transfer member 54 includes a single layer 52 comprising a polymer blend of polyphenylsulfone (PPSU) and cyclic alkylene terephthalate such as cyclic butylene terephthalate (CBT). In addition, carbon black particles 51 are dispersed within the layer 52 of PPSU and CBT to provide the proper conductivity. The carbon black 51 is present in an amount of from about 1 weight percent to about 30 weight percent, or from about 2 weight percent to about 25 weight percent, or from about 3 weight percent to about 20 weight percent of the intermediate transfer member. The polyphenylsulfone and cyclic butylene terephthalate are present in a weight ratio of from about 99 to 1 to about 51 to 49, or from about 95 to 5 to about 55 to 45, or from about 90 to 10 to about 60 to 40. The carbon black particles/polyphenylsulfone/cyclic alkylene terepthalte/are present in a weight ratio of from about 3/96/1 to about 30/36/34 or from about 10/80/10 to about 25/45/30, or from about 12/70/18 to about 18/56/26.

A polyphenylsulfone (PPSU) seamless ITB is disclosed in U.S. Ser. No. 13/009,073 and incorporated in its entirety herein. However, recent extensive testing of the PPSU seamless ITB has shown that the break strength of the ITB is marginal for an ITB having PPSU as the only polymer. There is a need to further improve the break strength of current PPSU ITB. Disclosed herein is a coating composition for the manufacture of ITBs. The composition comprises a polyphenylsulfone (PPSU), a cyclic butylene terephthalate (CBT) oligomer and carbon black where the CBT oligomer can be in situ polymerized into a semi crystalline polybutylene terephthalate (PBT) polymer. Optionally, the ITB comprises a siloxane copolymer for coating smoothness, and a tin catalyst to accelerate the CBT polymerization.

In order to enhance the break strength, the semi crystalline polymer polybutylene terephthalate is incorporated to introduce some crystalline domains into the amorphous polyphenylsulfone (PPSU) matrix. It is known that polyester is a semi crystalline polymer with excellent break strength, however, polyesters are insoluble in common organic solvents and thus not suitable for flow coating or solution casting. In a flow coating process all polymers need to be soluble or dispersible in organic solvents. Cyclic butylene terephthalate (CBT) oligomer is soluble or dispersible in common solvents, and most importantly, it can be in situ polymerized into a semi crystalline polybutylene terephthalate (PBT) polymer with the presence of a tin catalyst and heat, and the resulting PPSU/PBT blend ITB exhibits higher break strength.

The disclosed polyphenylsulfone (PPSU, structure as shown below), is available from Solvay as RADEL® R-5000NT.

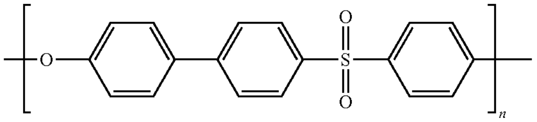

wherein n is from about 30 to 5,000, or from about 50 to 4,000 or from about 80 to 3,500. The polymer has a glass transition temperature $T_g$ of about 220° C. and is soluble in common organic solvents. The polyphenylsulfone is present in an amount of from about 35 weight percent to about 98 weight percent, or from about 45 weight percent to about 80 weight percent, or from about 55 weight percent to about 70 weight percent of the intermediate transfer member.

Other commercial polyphenylsulfone examples include RADEL® 5100NT15, 5900NT, and the like, all available from Solvay.

The disclosed cyclic alkylene terephthalate is represented by the structure below.

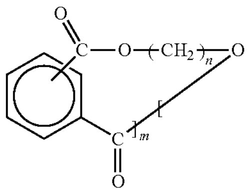

wherein m is from about 1 to about 100, or from about 5 to about 90 or from about 10 to about 80, and n is from about 1 to about 8, or from about 2 to about 7, or from about 3 to about 6. The cyclic alkylene terephthalate is present in an amount of from about 1 weight percent to about 35 weight percent, or from about 5 weight percent to about 30 weight percent, or from about 10 weight percent to about 25 weight percent of the intermediate transfer member.

Specific examples of the cyclic alkylene terephthalate includes cyclic butylene terephthalate (CBT), cyclic propylene terephthalate, cyclic pentylene terephthalate, and the like and mixtures thereof. The disclosed cyclic butylene terephthalate (CBT) oligomer is CBT® XB0-C from Cyclics Corp. Other examples of CBT include CBT® XB3-CA5, 100, 160, 500 and XL101. The CBT has a melting point of 134-144° C., and when polymerized, the resulting PBT has a melting point of about 228° C. Thus, temperatures greater than 230° C. such as 240° C. are chosen to cure the disclosed PPSU/CBT blend ITB for both in situ polymerization of CBT and above the $T_m$ of the resulting PBT. After curing, the blend ITB cools down, where the melting PBT starts to crystallize within the amorphous PPSU matrix, and the resulting blend ITB has shown improved break strength.

The common organic solvents used to dissolve the PPSU and CBT include N-methylpyrrolidone (NMP), N,N'-dimethylformamide (DMF), tetrahydrofuran (THF), N,N'-dimethylacetamide (DMAc), tetramethylene sulfone and monochlorobenzene.

Carbon materials suitable for use herein include carbon black, acetylene black, graphite, carbon nanotubes, graphene, fluorinated carbon black, and the like, and mixtures thereof. One carbon black suitable for the composition is special black 4 (B.E.T. surface area=180 $m^2$/g, DBP absorption=1.8 ml/g, primary particle diameter=25 nanometers) from Evonik-Degussa. Other suitable carbon black examples include special black 5 (B.E.T. surface area=240 $m^2$/g, DBP absorption=1.41 ml/g, primary particle diameter=20 nanometers), color black FW1 (B.E.T. surface area=320 $m^2$/g, DBP absorption=2.89 ml/g, primary particle diameter=13 nanometers), color black FW2 (B.E.T. surface area=460 $m^2$/g, DBP absorption=4.82 ml/g, primary particle diameter=13 nanometers), and color black FW200 (B.E.T. surface area=460 $m^2$/g, DBP absorption=4.6 ml/g, primary particle diameter=13 nanometers), all available from Evonik-Degussa. After the solvent is removed the carbon black comprises from about 1 weight percent to about 30 weight percent, or from about 2 weight percent to about 25 weight percent, or from about 3 weight percent to about 20 weight percent of the seamless layer.

Optionally, polysiloxane can be present in the intermediate transfer member (for surface smoothness) and includes a polyether modified polydimethylsiloxane, commercially available from BYK Chemical with the trade name of BYK® 333, BYK® 330 (about 51 weight percent in methoxypropylacetate) and 344 (about 52.3 weight percent in xylene/isobutanol=80/20), BYK®-SILCLEAN 3710 and 3720 (about 25 weight percent in methoxypropanol); a polyester modified polydimethylsiloxane, commercially available from BYK Chemical with the trade name of BYK® 310 (about 25 weight percent in xylene) and 370 (about 25 weight percent in xylene/alkylbenzenes/cyclohexanone/monophenylglycol=75/11/7/7); a polyacrylate modified polydimethylsiloxane, commercially available from BYK Chemical with the trade name of BYK®-SILCLEAN 3700 (about 25 weight percent in methoxypropylacetate); or a polyester polyether modified polydimethylsiloxane, commercially available from BYK Chemical with the trade name of BYK® 375 (about 25 weight percent in Di-propylene glycol monomethyl ether). The amount of polysiloxane in the ITB is from about 0.01 weight percent to about 2 weight percent, or from about 0.03 weight percent to about 1 weight percent, or from about 0.05 weight percent to about 0.2 weight percent.

The formed intermediate transfer belt (ITB) can have a surface resistivity ranging from about $10^8$ ohms/sq to about $10^{13}$ ohms/sq, or ranging from about $10^9$ ohms/sq to about $10^{12}$ ohms/sq, or ranging from about $10^{10}$ ohms/sq to about $10^{11}$ ohms/sq. In embodiments, the formed ITB coating can have a mechanical Young's modulus ranging from about 3,000 MPa to about 6,000 MPa, or ranging from about 3,500 MPa to about 5,500 MPa, or ranging from about 4,200 MPa to about 5,000 MPa. In embodiments, the ITB layer has a total thickness of from about 30 microns to about 500 microns, or from about 50 microns to about 300 microns, or from about 70 microns to about 150 microns. The coefficient of thermal expansion (CTE) of the copolymer of PPSU/CBT ITB containing carbon black particles is from about 50 ppm/° C. to about 150 ppm/° C., or from about 70 ppm/° C. to about 120 ppm/° C. The break strength of the ITB described herein is at least 50 MPa, or at least 60 MPa, or at least 70 MPa.

The coefficient of hygroscopic expansion (CHE) of the copolymer of PPSU/CBT ITB containing carbon black particles is from about 10 ppm/% humidity, or from about 20 ppm/% humidity to about 30 ppm/% humidity.

The surface roughness of the copolymer of PPSU/CBT ITB containing carbon black particles is from about 0.04 micron to about 0.2 micron.

The coating mixture or solution is coated in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, and the like. After coating the composition, the coating is cured at about 125° C. for about 30 minutes, and then at about 190° for about 40 minutes, and finally at about 240° C. for about 60 minutes.

While embodiments have been illustrated with respect to one or more implementations, alterations and/or modifications can be made to the illustrated examples without departing from the spirit and scope of the appended claims. In addition, while a particular feature herein may have been disclosed with respect to only one of several implementations, such feature may be combined with one or more other features of the other implementations as may be desired and advantageous for any given or particular function.

EXAMPLES

A coating composition comprising a PPSU (RADEL® R-5000NT), a CBT (CBT® XB0-C), a carbon black(special black 4) and optionally a polysiloxane copolymer (BYK® 333) and a tin catalyst (dibutyltin dilaurate) with a weight ratio of 81.8/5/13/0.1/0.1 in NMP was prepared by an Attritor.

A controlled composition comprising a PPSU (RADEL® R-5000NT), a carbon black (special black 4) and optionally a polysiloxane copolymer (BYK® 333) with a weight ratio of 86.9/13/0.1 in NMP was prepared similarly. The resulting PPSU/CBT blend ITB was cured at about 125° C. for about 30 minutes, and then at about 190° for about 40 minutes, and finally at about 240° C. for about 60 minutes, where the CBT was in situ polymerized into the PBT. The controlled PPSU ITB was cured similarly.

When compared with an ITB composed of a polymer of PPSU, the disclosed PPSU/CBT blend ITB exhibited comparable surface resistivity, however, significantly improved break strength (Table 1).

TABLE 1

| | PPSU ITB | PPSU/CBT ITB |
|---|---|---|
| Surface resistivity (ohm/sq) | $1.8 \times 10^9$ | $4.6 \times 10^9$ |
| Young's modulus (MPa) | 3,600 | 4,200 |
| Break strength (MPa) | 40 | 84 |

Other properties such as Young's modulus were also improved with the disclosed PPSU/CBT blend ITB.

The disclosed blend ITB was flow coated, and a seamless ITB of excellent quality was obtained, which was further tested to possess similarly improved break strength.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. An intermediate transfer member comprising:

a seamless layer comprising a polymer blend of polyphenylsulfone and cyclic alkylene terephthalate having dispersed therein carbon black particles wherein the polymer blend is free of polyarylene sulfide.

2. The intermediate transfer member of claim 1 wherein the polyphenylsulfone is represented by;

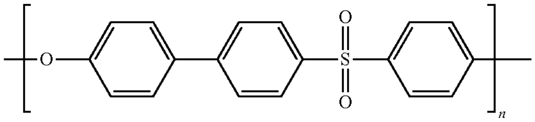

wherein n is from about 30 to about 5,000.

3. The intermediate transfer member of claim 1 wherein the cyclic alkylene terephthalate (CBT) is represented by

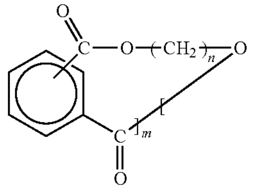

wherein m is from about 1 to about 100, n is from about 1 to about 8.

4. The intermediate transfer member of claim 1 wherein the polyphenylsulfone and cyclic alkylene terephthalate comprise a weight ratio of from about 99/1 to about 51/49.

5. The intermediate transfer member of claim 1 wherein the layer further comprises polysiloxane.

6. The intermediate transfer member of claim 5 wherein the polysiloxane is selected the group consisting of a polyester modified polydimethylsiloxane, a polyether modified polydimethylsiloxane, a polyacrylate modified polydimethylsiloxane, a polyester polyether modified polydimethylsiloxane, and mixtures thereof, present in an amount of from about 0.01 weight percent to about 2 weight percent of the member.

7. The intermediate transfer member of claim 5 wherein the polysiloxane polymer comprises from about 0.05 weight percent to about 0.5 weight percent of the seamless layer.

8. The intermediate transfer member of claim 1 wherein the carbon black comprises an amount of from about 1 to about 30 weight percent based on total weight of the seamless layer.

9. The intermediate transfer member of claim 1 wherein the polyphenylsulfone comprises from about 35 weight percent to about 98 weight percent of the seamless layer.

10. The intermediate transfer member of claim 1 wherein the alkylene terephthalate comprises a cyclic butylene terephthalate comprises from about 1 weight percent to about 35 weight percent of the seamless layer.

11. The intermediate transfer member of claim 1 comprising a Young's Modulus of at least about 3,000 MPa.

12. The intermediate transfer member of claim 1 comprising a break strength of at least about 50 MPa.

13. The intermediate transfer member of claim 1 wherein the seamless layer has a thickness of from about 30 microns to about 400 microns.

14. An intermediate transfer member comprising:

a seamless layer comprising carbon black particles, dispersed in a polymer blend of polyphenylsulfone and cyclic alkylene terepthalate wherein the polyphenylsulfone is represented by

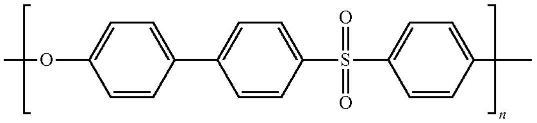

wherein n is from about 30 to about 5000, and cyclic alkylene terephthalate is represented by

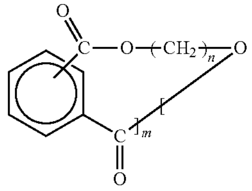

wherein m is from about 1 to about 100, n is from about 1 to about 8, and the seamless layer comprises a weight ratio of carbon black particles/polyphenylsulfone/cyclic alkylene terephthalate of from about 3/96/1 to about 30/36/34 wherein the polymer blend is free of polyarylene sulfide.

15. The intermediate transfer member of claim 14 comprising a Young's Modulus of at least 3,000 MPa.

16. The intermediate transfer member of claim 14 comprising a break strength of at least 50 MPa.

17. A coating composition comprising:

a polymer blend of polyphenylsulfone, cyclic alkylene terephthalate, carbon black particles and a solvent selected from the group consisting of N-methylpyrrolidone (NMP), N,N'-dimethylformamide (DMF), tetrahydrofuran (THF), N,N'-dimethylacetamide (DMAc), tetramethylene sulfone and monochlorobenzene wherein the polymer blend is free of polyarylene sulfide.

18. The composition of claim 17 further comprising a polysiloxane.

19. The composition of claim 17 wherein the polyphenylsulfone is represented by;

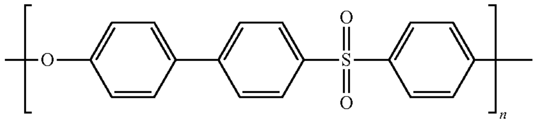

wherein n is from about 30 to about 5,000.

20. The composition of claim 17 wherein the cyclic alkylene terephthalate (CBT) is represented by

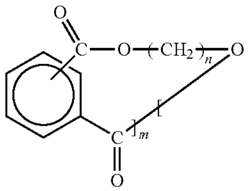

wherein m is from about 1 to about 100, n is from about 1 to about 8.

* * * * *